United States Patent
Miki

(10) Patent No.: US 8,427,644 B2
(45) Date of Patent: Apr. 23, 2013

(54) OPTICAL DISPLACEMENT METER

(75) Inventor: Yutaka Miki, Kawasaki (JP)

(73) Assignee: Mitutoyo Corporation, Kanagawa (JP)

( * ) Notice: Subject to any disclaimer, the term of this patent is extended or adjusted under 35 U.S.C. 154(b) by 333 days.

(21) Appl. No.: 12/834,144

(22) Filed: Jul. 12, 2010

(65) Prior Publication Data

US 2011/0013186 A1 Jan. 20, 2011

(30) Foreign Application Priority Data

Jul. 16, 2009 (JP) ................................. 2009-168197
Dec. 21, 2009 (JP) ................................. 2009-289793

(51) Int. Cl.
*G01J 4/00* (2006.01)

(52) U.S. Cl.
USPC ........................................................ 356/364

(58) Field of Classification Search .................. 356/614, 356/364
See application file for complete search history.

(56) References Cited

U.S. PATENT DOCUMENTS

| 5,785,651 | A * | 7/1998 | Kuhn et al. .................... 600/310 |
| 7,626,705 | B2 | 12/2009 | Altendorf |
| 7,986,415 | B2 | 7/2011 | Thiel et al. |
| 8,194,251 | B2 * | 6/2012 | Emtman et al. ............... 356/445 |
| 2006/0109483 | A1 * | 5/2006 | Marx et al. .................... 356/609 |
| 2007/0296959 | A1 | 12/2007 | Schwotzer |
| 2009/0279103 | A1 | 11/2009 | Thiel et al. |

FOREIGN PATENT DOCUMENTS

| DE | 102007005726 | 8/2008 |
| JP | 57-79414 | 5/1982 |
| JP | 1-15808 | 3/1989 |
| JP | 2008-256679 | 10/2008 |

OTHER PUBLICATIONS

Search report from E.P.O., mail date is Jul. 18, 2012.

* cited by examiner

*Primary Examiner* — Roy M Punnoose
(74) *Attorney, Agent, or Firm* — Greenblum & Bernstein, P.L.C.

(57) ABSTRACT

An optical displacement meter includes: a spatial filter configured to extract light under measurement of a wavelength focused on a measurement target and to specify the wavelength of the light under measurement; a polarizer configured to divide the light collimated and caused to propagate in one direction into linearly polarized beams in two directions orthogonal to a propagating direction; a wavelength plate that allows passage of the linearly polarized beams to produce elliptically polarized light having a phase difference commensurate with a light wavelength; a polarized light separator configured to divide the elliptically polarized light into polarized light components in the two directions; and a computing circuit configured to perform computation of $(A-B)/(A+B)$ by use of light quantity signals A and B, which respectively correspond to the two polarized light components.

4 Claims, 15 Drawing Sheets

FIG. 6
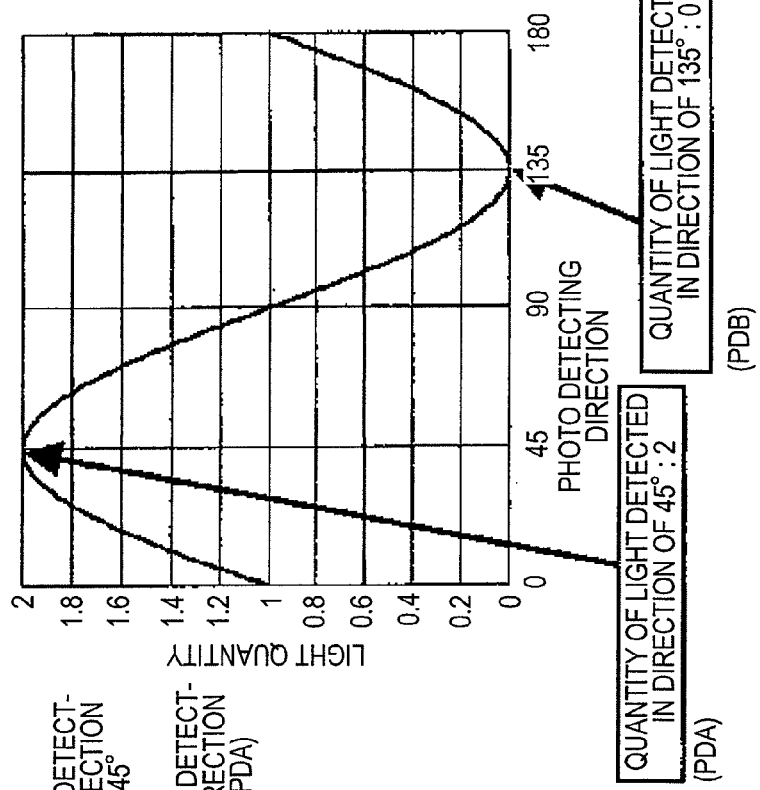
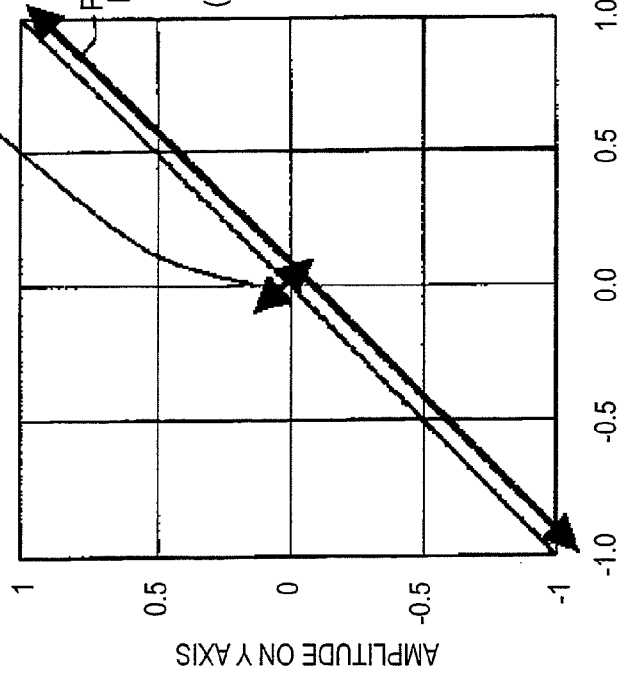

FIG. 7
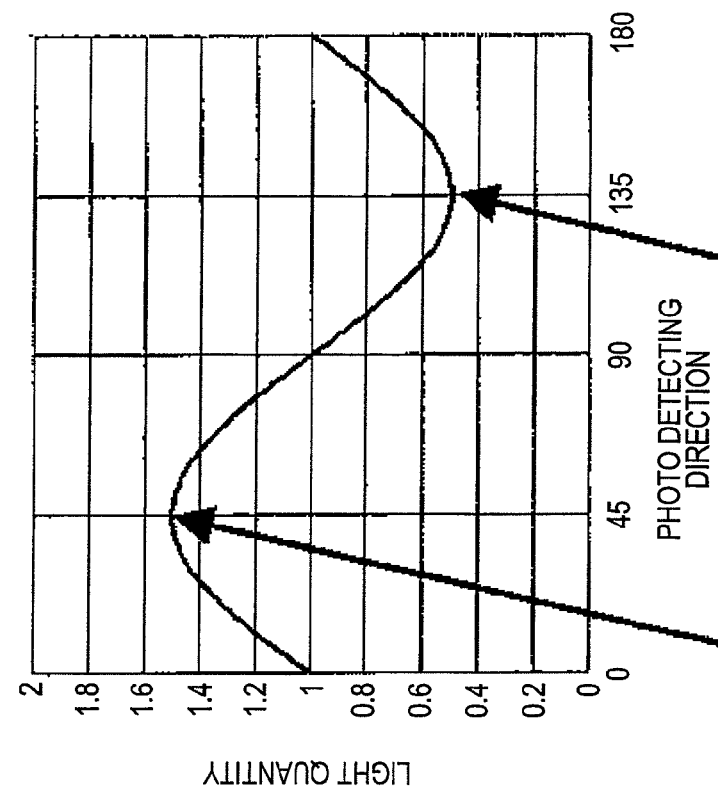
A (i) POLARIZED STATE
LISSAJOUS'S WAVEFORM (AMPLITUDE)
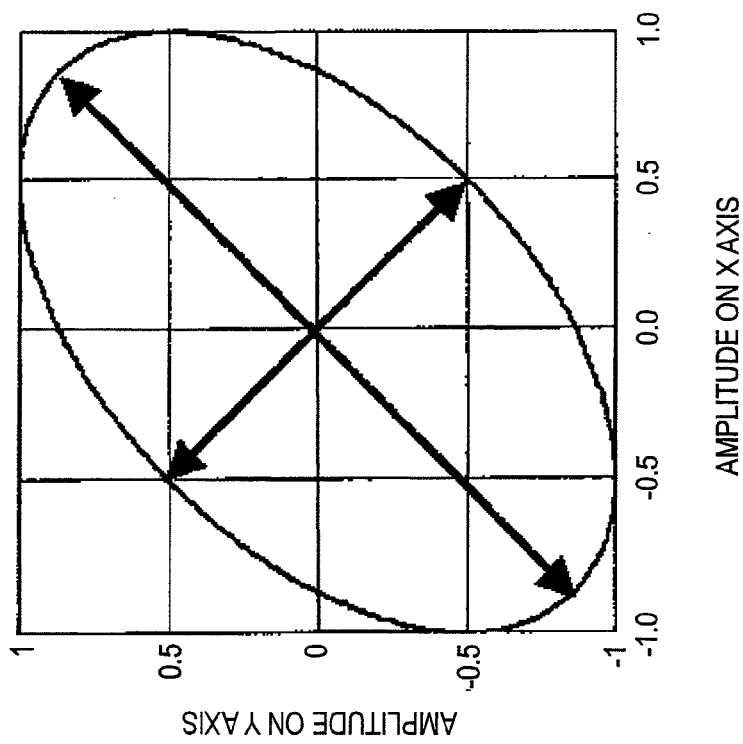
B (ii) CHANGE IN LIGHT QUANTITY ACHIEVED IN PHOTO DETECTING DIRECTION
QUANTITY OF LIGHT RECEIVED THROUGH PHOTODETECTOR
QUANTITY OF LIGHT RECEIVED BY PDA: 1.5
QUANTITY OF LIGHT RECEIVED BY PDB: 0.5
RESULT OF COMPUTATION OF (A−B)/(A+B): +0.5

FIG. 8
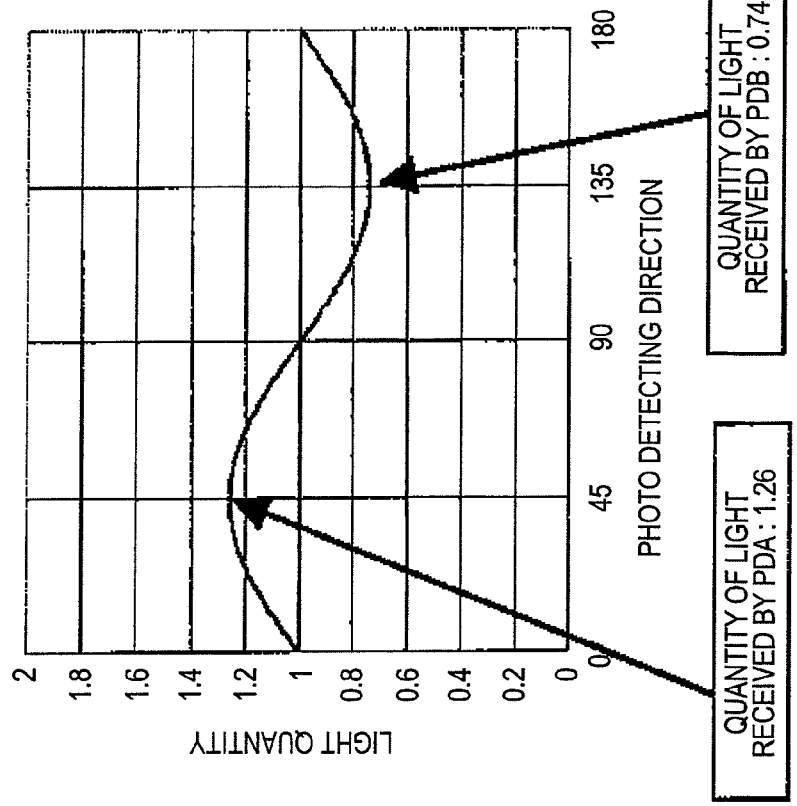
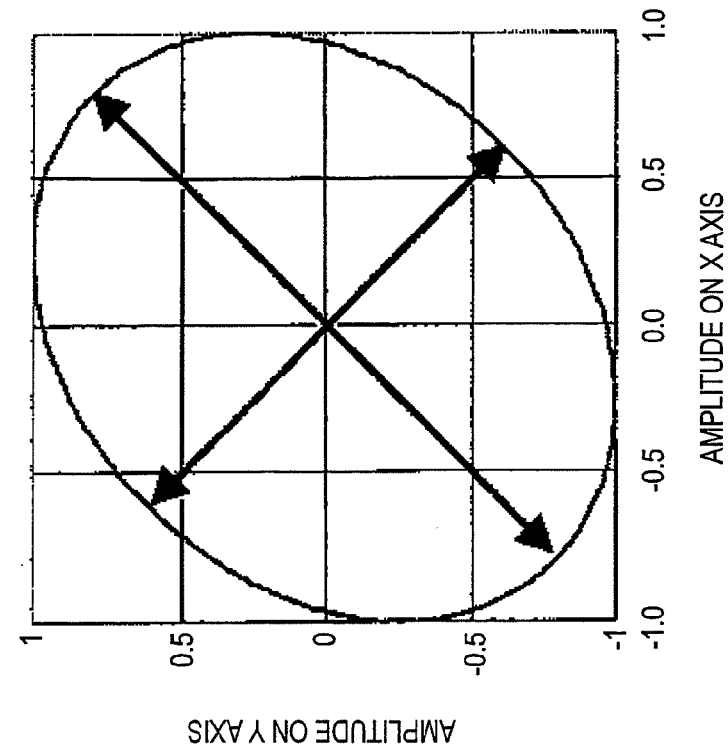

FIG. 9
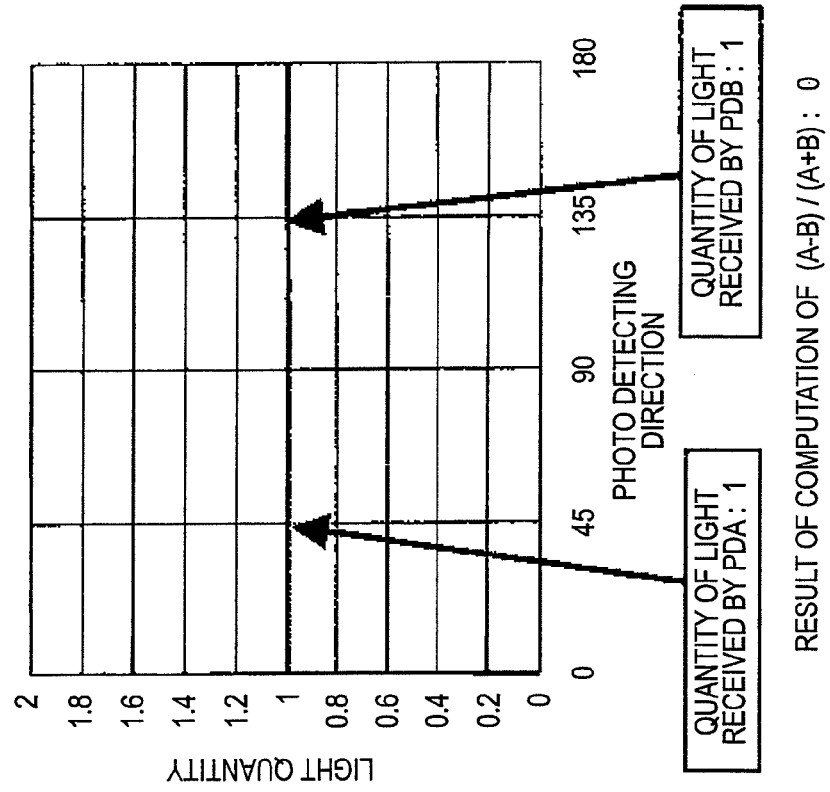
B
(ii) CHANGE IN LIGHT QUANTITY ACHIEVED IN PHOTO DETECTING DIRECTION
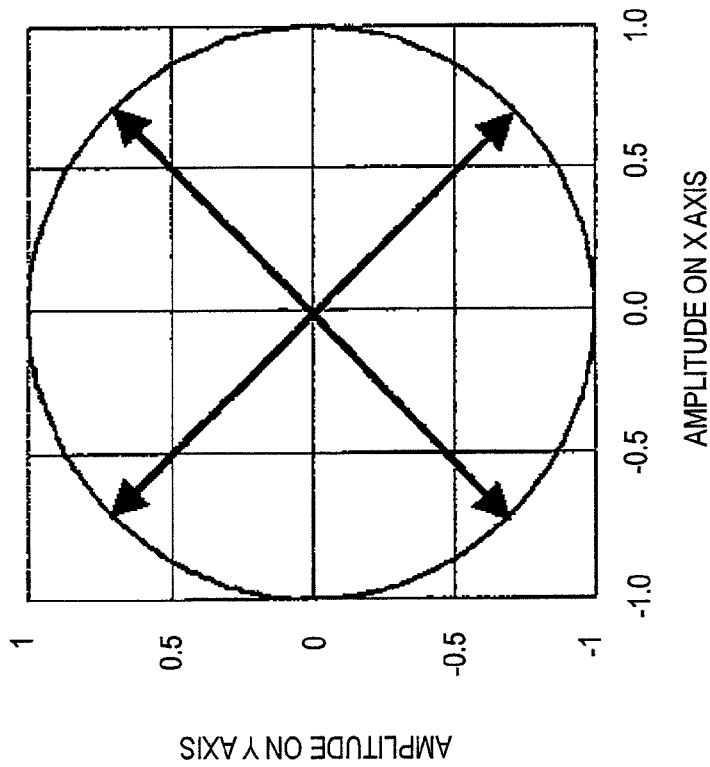
A
(i) POLARIZED STATE
LISSAJOUS'S WAVEFORM (AMPLITUDE)

FIG. 10
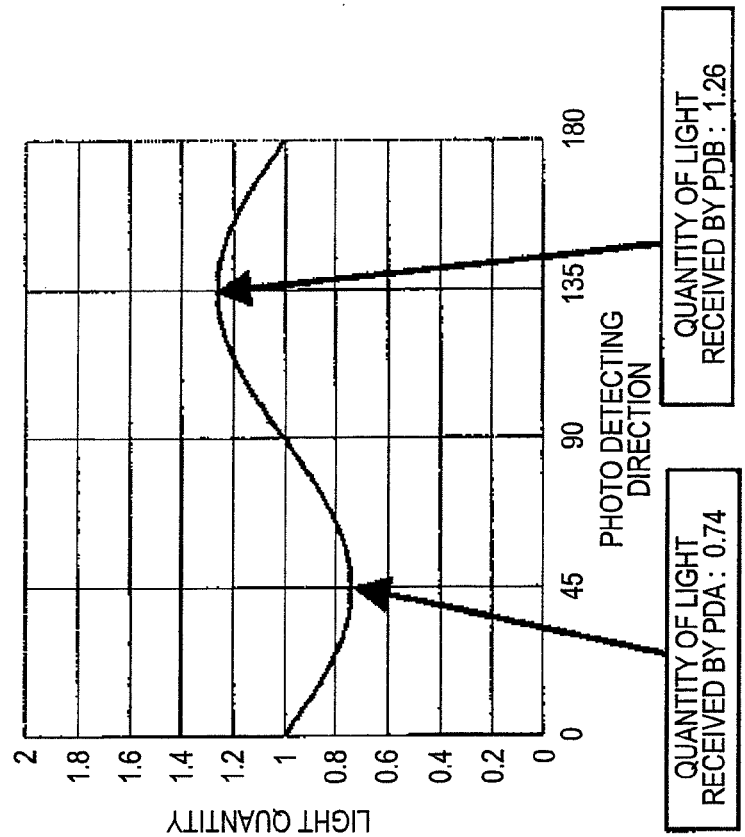
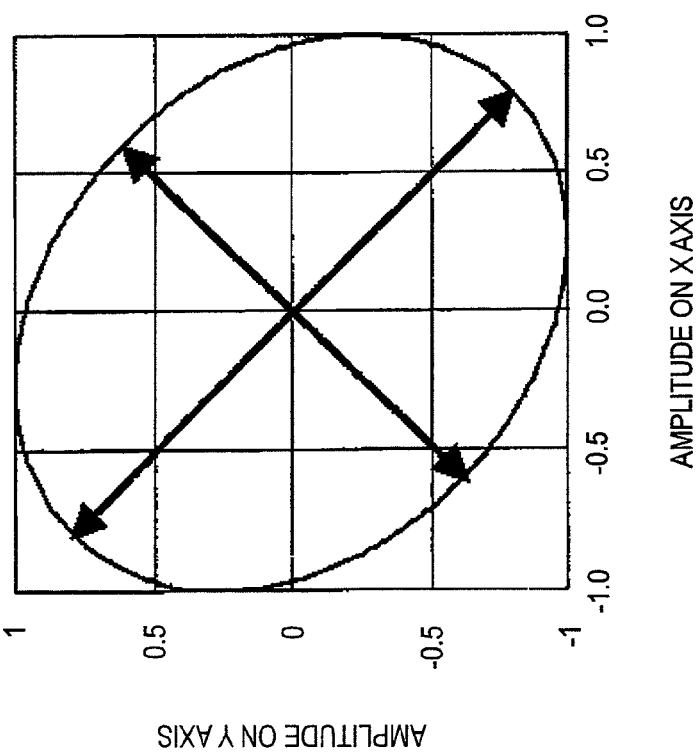

FIG. 11
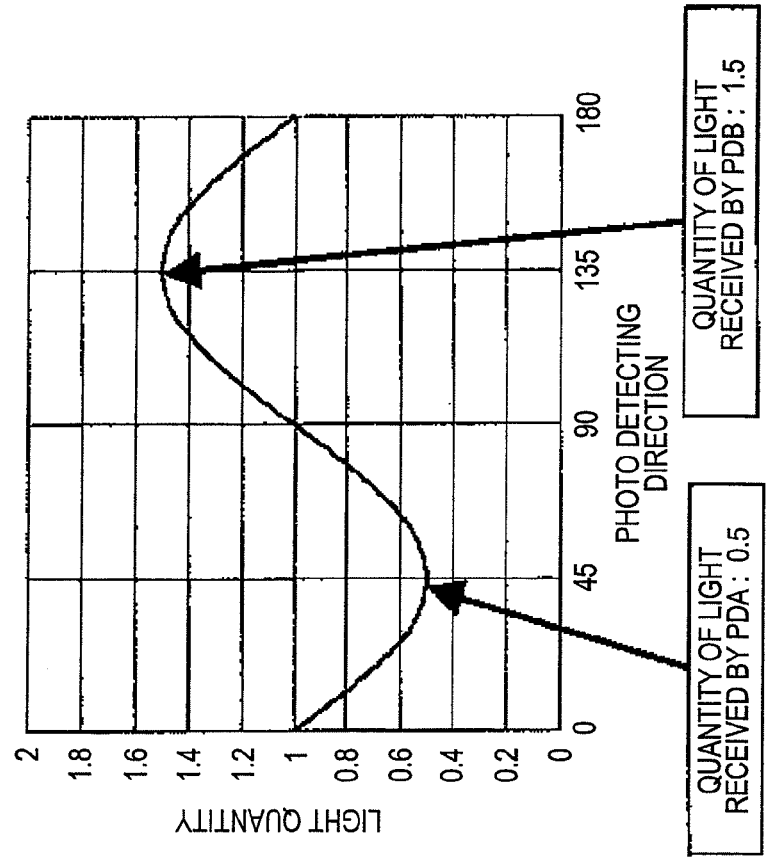
B
(ii) CHANGE IN LIGHT QUANTITY ACHIEVED IN PHOTO DETECTING DIRECTION
QUANTITY OF LIGHT RECEIVED THROUGH PHOTODETECTOR
QUANTITY OF LIGHT RECEIVED BY PDB : 1.5
QUANTITY OF LIGHT RECEIVED BY PDA : 0.5
RESULT OF COMPUTATION OF (A−B)/(A+B) : −0.5
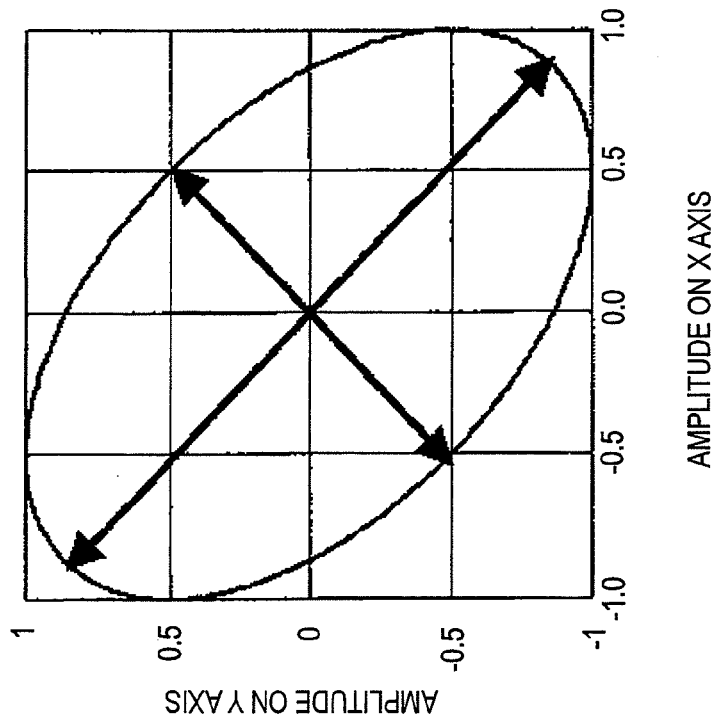
A
(i) POLARIZED STATE
LISSAJOUS'S WAVEFORM (AMPLITUDE)

FIG. 12

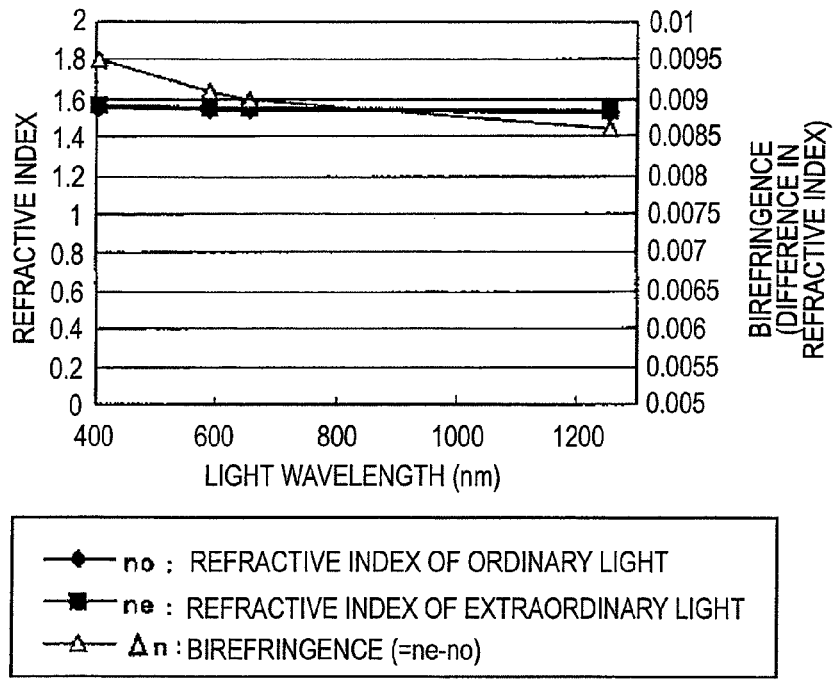

DISPERSION OF REFRACTIVE INDEX OF CRYSTAL

- no : REFRACTIVE INDEX OF ORDINARY LIGHT
- ne : REFRACTIVE INDEX OF EXTRAORDINARY LIGHT
- Δn : BIREFRINGENCE (=ne-no)

FIG. 13

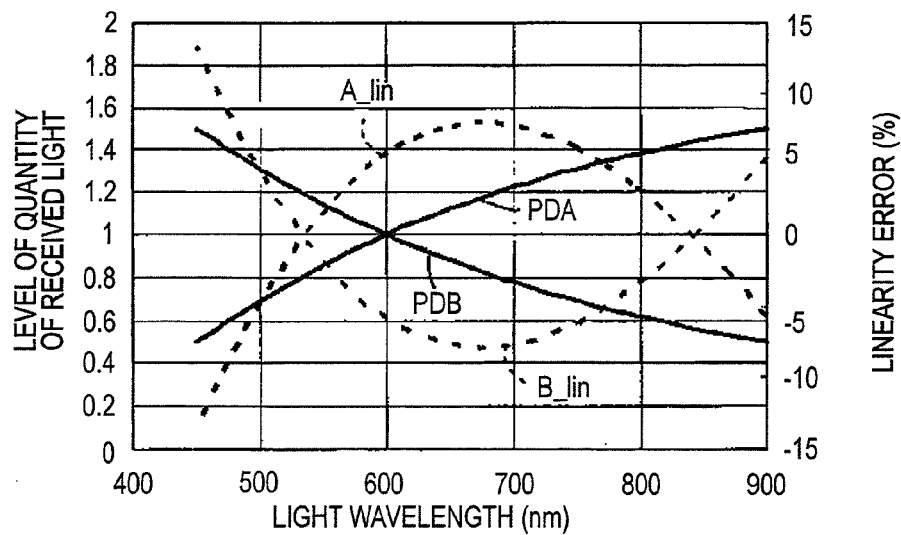

WAVELENGTH CHARACTERISTIC OF QUANTITY OF LIGHT RECEIVED BY PD AND LINEARITY THEREOF

PDA: LEVEL OF QUANTITY OF LIGHT RECEIVED BY PDA
PDB: LEVEL OF QUANTITY OF LIGHT RECEIVED BY PDB
A_lin: LINEARITY ERROR IN LEVEL OF QUANTITY OF LIGHT RECEIVED BY PDA
B_lin: LINEARITY ERROR IN LEVEL OF QUANTITY OF LIGHT RECEIVED BY PDB

FIG. 18A
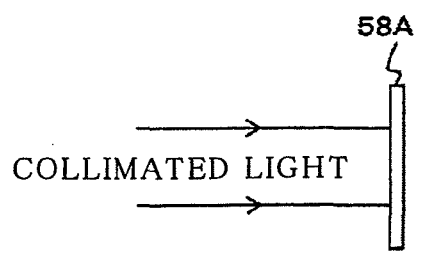
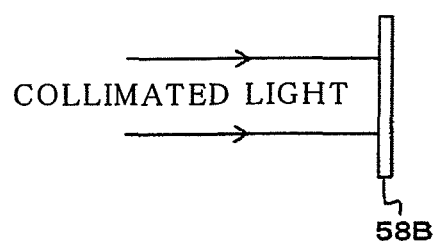
FIG. 18B
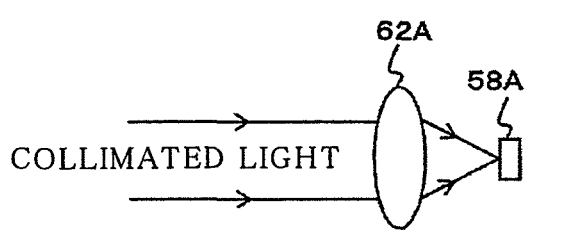
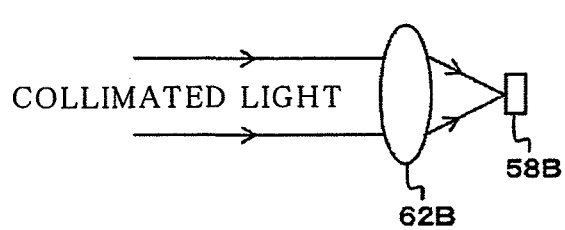
FIG. 19
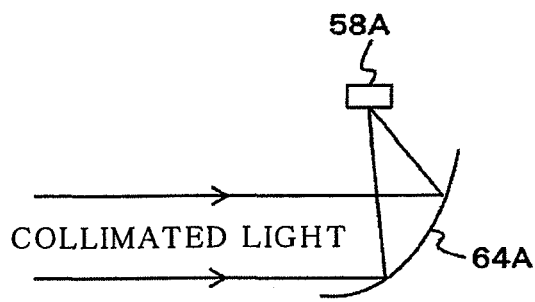
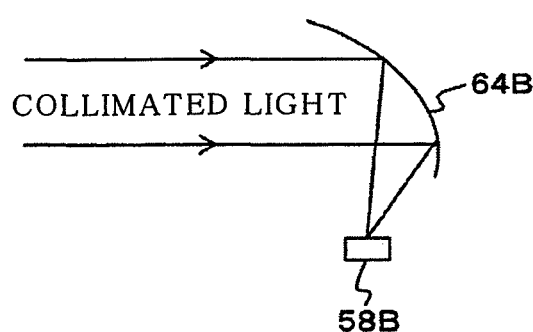

OPTICAL DISPLACEMENT METER

CROSS-REFERENCE TO RELATED APPLICATION(S)

This application is based upon and claims the benefit of priority based upon Japanese Patent Application No. 2009-168197, filed on Jul. 16, 2009, and Japanese Patent Application No. 2009-289793, filed on Dec. 21, 2009, the entire contents of which are incorporated herein by reference.

BACKGROUND

1. Field of the Invention

The present invention relates to an optical displacement meter and, more particularly, an improvement in a portion for measuring a wavelength of light under measurement that makes it possible to enhance resolving power and high speed response of a chromatic confocal displacement meter and miniaturize the chromatic confocal displacement meter.

2. Description of the Related Art

A chromatic confocal displacement meter (see JP-A-2008-256679) whose entire configuration is shown in FIG. 1 utilizes the following principle. Specifically, an objective lens 12 exhibiting great chromatic aberration along an optical axis varies in focal length according to a light wavelength (color). The objective lens comes into a focus at a close distance for blue light and a far distance for red light. A confocal point (the position of a focal point of a collimator lens 14 whose chromatic aberration is corrected) that is located opposite to a workpiece 8 under measurement with reference to the objective lens 12 is deemed to be common regardless of a color. When a point source of white light or a wideband point source of light is placed at the confocal point, a color focused on the workpiece 8 changes in a one-to-one correspondence according to the height of the workpiece 8. So long as a spatial filter, such as a pinhole, is provided at the location of the confocal point achieved when light reflected from the workpiece 8 returns and so long as the reflected light is let pass through the spatial filter, light of the color focused on the workpiece can be extracted.

A color (optical wavelength) is specified by use of a spectrometer 26, such as a diffraction grating, provided in a console 20, whereby the height (displacement) of the workpiece 8 exhibiting a one-to-one correspondence with the color can be measured.

In general, there are many cases where light (broadband light) is generally guided to a confocal point of a sensor head 10 by use of an optical fiber 30; where a core of an end face 30A of the optical fiber is taken as a confocal point while likened to a pin hole; and where a diverging ray is given to the collimator lens 14 in many cases.

As illustrated in FIG. 2, of the white color beams radiated on the workpiece 8 after having undergone reflection on the workpiece, light of the color (green light in FIG. 2) focused on the workpiece 8 is selectively collected on the position of the confocal point on the end face 30A of the optical fiber. The light is captured into the core of the optical fiber and guided to the spectrometer 26 byway of an optical fiber coupler 24. In the meantime, light of the other colors is blocked by a circumference of core of the optical fiber end face 30A that is worked as the pin hole, to thus become unable to enter the optical fiber 30.

The spectrometer 26 detects a wavelength of the light returned to an interior of the optical fiber 30, and an output from the spectrometer 26 is input to an electronic circuit 28, where the output is processed.

As illustrated in FIG. 3, a spectrometer portion for specifying a light wavelength (color) of the related-art chromatic confocal displacement meter uses a diffraction grating utilizing a diffracting phenomenon of light, a prism utilizing chromatic dispersion of a refractive index, and an optical element 26A that spatially separates colors from each other, to thus let the separated colors exit. A linear array light-receiving element 26B, such as a C-MOS sensor, a CCD, and a photodiode array, receives light, detects a direction in which the light exited, and specifies a wavelength of the light. In FIG. 3, reference numeral 26C designates a collimator lens whose chromatic aberration for collimating light that has exited from the optical fiber 30 after having undergone reflection on the workpiece has been corrected.

When there is used the linear array light-receiving element 26B, such as that illustrated in FIG. 3, three requirements must be satisfied in order to accomplish high resolving power; namely, (1) a narrow pitch between light receiving elements; (2) a large number of the light receiving elements; and (3) a superior signal-to-noise ratio of each of the light receiving elements.

However, under the constrains that the linear array light receiving elements should be used, it has been difficult to accomplish high speed response and high resolving power as follows.

When a CCD is used, the pitch of the light receiving elements is narrow, the number of light receiving elements is large, and a superior signal-to-noise ratio is achieved. However, since a serial output is produced, exhibition of a high speed response of 1 kHz or more is difficult.

In the meantime, when a C-MOS sensor is used, the pitch of the light receiving elements is narrow, the number of light receiving elements is large, and a parallel output is produced. Although a high speed response of tens of kilohertz or more can be accomplished, it is difficult to accomplish high resolving power and high speed response because of a poor signal-to-noise ratio.

When a photodiode array is used, a superior signal-to-noise ratio is exhibited, and a high speed response is accomplished. However, it is difficult to increase the number of light receiving elements (the number of light receiving elements necessary to accomplish high resolving power is of the order of thousands) by narrowing the pitch of the light receiving elements, and hence difficulty is encountered in accomplishing high resolving power. Moreover, when a signal processing circuit is provided in number equal to the light receiving elements, a problem of an increase in circuit scale also arises.

In the meantime, a noncontact displacement meter of a type other than the chromatic confocal displacement meter includes an electrostatic displacement meter, an optical interference displacement meter, an optical fiber displacement meter, a triangulation displacement meter, a focusing displacement meter for detecting the position of a lens achieved during focusing operation by scanning the objective lens, a confocal displacement meter, and the like.

However, the electrostatic displacement meter can accomplish high speed response and high resolving power but encounters problems of producing a large measurement spot, providing a short working distance, being vulnerable to an inclination, and generating an error because the displacement meter is a nonconductor.

Alternatively, the optical interference displacement meter also exhibits high speed response and high resolving power. However, the displacement meter produces drawbacks of being unable to cope with a step and perform ABS measurement, being vulnerable to an inclination, producing a large measurement spot, and being greatly influenced by surface roughness.

The optical fiber displacement meter exhibits high speed response but encounters drawbacks of requiring calibration for each material, producing a large measurement spot, and providing a short working distance.

The triangulation displacement meter exhibits a comparatively superior response but encounters drawbacks of being difficult to exhibit high speed response with high resolving power and being vulnerable to an inclination.

The focusing displacement meter and the confocal displacement meter produce minute measurement spots and provide long working distances but encounter drawbacks of providing low response and a great heat drift.

As mentioned above, a displacement meter capable of accomplishing high speed response of 100 kHz or more while keeping high resolving power of the order of nanometers (high resolving power in terms of a signal-to-noise ratio rather than display resolving power) is only the electrostatic displacement meter and the optical interference displacement meter. However, the electrostatic displacement meter and the optical interference displacement meter encounter drawbacks of providing a short working distance, being vulnerable to an inclination, and producing a large measurement spot.

Meanwhile, a technique described in connection with JP-B-1-15808, which is not the chromatic confocal displacement meter, is available as one technique for measuring a light wavelength.

As shown in FIG. 4, when a direction of propagation of light is taken as a Z axis and when directions orthogonal to the Z axis are taken as X and Y axes, a light wavelength is measured as follows.

(1) Light under measurement in an arbitrarily polarized state is collimated and caused to propagate in a direction Z.

(2) An orientation of an axis of a polarizer 40 is set to an angle of 45 between the X and Y axes, and light is caused to pass along the axis, whereby linearly polarized light oriented in an angle of 45° between the X and Y axes.

(3) Light is let pass through a wavelength plate 42 having a lead axis aligned to the X axis and a lag axis aligned to the Y axis, whereby elliptically polarized light having a phase difference commensurate with a light wavelength (existing between X and Y polarized waves) is obtained.

(4) Calcite 44 is arranged while inclined in a direction of 45° between the X and Y axes, and the elliptically polarized light is separated into a polarized light component oriented in a direction of an angle of 45° between the X and Y axes and a polarized light component oriented in a direction of an angle of 135° between the X and Y axes. A photodiode (PD) receives respective amounts of light, thereby generating light amount voltage signals A and B.

(5) An analogue circuit (omitted from the drawings) computes a ratio of A to B (A/B) and further subjects a computation result to logarithmic operation, whereby there is obtained a voltage output exhibiting a gentle monotonous change in response to a change in light wavelength within a certain range of a light wavelength.

As shown in FIG. 3, under the method for detecting a light wavelength while separating the wavelength according to directions by means of the optical element 26B, such as a diffraction grating, a distance from the optical element 26A to the linear array light receiving element 26B must be increased in order to enlarge an angular difference between the directions of the light wavelengths as a positional difference. On the contrary, the method shown in FIG. 4 enables easy miniaturization of the displacement meter and is characterized in that higher speed response of signal processing can be accomplished when compared with a case where a slow response linear array light receiving element is used because a high response single photodiode is used.

SUMMARY

The present invention has been conceived to solve the drawbacks of the related art and meets a challenge of enabling accomplishment of high resolving power, high speed response, and miniaturization while taking advantage of merits of a chromatic confocal displacement meter; namely, resistance to an inclination, high linearity, a great working range, a minute measurement spot, and the ability to measure nonmetal.

According to the present invention, a phase difference (an optical path difference) commensurate with a light wavelength arises between vertical polarized light components passing through the wavelength plate formed from; e.g., a birefringent crystal. By utilization of the phenomenon, the phase difference is detected in place of a ratio between light quantities of the polarized light components. On this occasion, so long as the thickness of the birefringent crystal and the range of a light wavelength are appropriately selected, the spectrometer produces a voltage output that shows a gentle monotonous change with reference to the change in light wavelength.

Specifically, according to an aspect of the present invention, there is provided an optical displacement meter configured to measure a position of a measurement target, the optical displacement meter including: an objective lens; a broadband light source placed at a confocal point opposite to the measurement target with respect to the objective lens; a spatial filter placed at a position of a confocal point achieved when light reflected from the measurement target returns, the spatial filter being configured to extract light under measurement of a wavelength focused on the measurement target and specify the wavelength of the light under measurement; a polarizer configured to divide the light under measurement collimated and caused to propagate in one direction into linearly polarized beams of two directions orthogonal to a propagating direction; a wavelength plate that allows passage of the linearly polarized beams of the two directions to produce elliptically polarized light having a phase difference commensurate with a light wavelength; a polarized light separation element configured to divide the elliptically polarized light into polarized light components with respect to the two directions; a light receiving element configured to detect quantities of the respective polarized light components; and a computing circuit configured to perform computation of $(A-B)/(A+B)$ by use of light quantity signals A and B detected by the light receiving element.

The light receiving element may have an acceptance surface that is smaller than a sectional area of the collimated light passing through the polarized light separation element.

The optical displacement meter may have a concentrating unit configured to concentrate the collimated light passing through the polarized light separation element.

The concentrating unit may be a light collection system, and the light receiving element may be placed at a focal point of the light collection system to obtain sufficient light amount.

According to the present invention, drawbacks of the related-art chromatic confocal displacement meter that cannot accomplish high resolving power and high speed response are surmounted. Measurement of displacement simultaneously satisfying a long working range, a fine measurement spot, a smaller error due to an inclination, high resolving power, and high speed response that have been difficult for a noncontact displacement meter of another type to accomplish becomes possible. Further, in a case that the light receiving element having the small acceptance surface is used, the response speed is improved.

In the case of a transparent substance, difficulty is encountered in distinguishing between a surface and light from the surface. Therefore, measurement of a thickness of a thin transparent substance that has been possible for the related-art chromatic confocal displacement meter becomes impossible to perform.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 6A is a view showing a polarized state achieved when a light receiving element PD not having a wavelength plate receives an output from a polarizer which is linearly polarized light in a direction of 45° between X and Y axes of the embodiment;

FIG. 6B is a view showing a change in light quantity achieved in a photo detecting direction that is a direction of extraction of a polarized light component when the light receiving element PD not having the wavelength plate receives the output from the polarizer which is linearly polarized light in the direction of 45° between the X and Y axes of the embodiment;

FIG. 7A is a view showing a polarized state achieved when an output from a polarizer and a wavelength plate resulting from entrance of light having a light wavelength of 900 nm shows a phase difference of 60° between the X and Y axes;

FIG. 7B is a view showing an example change in light quantity achieved in a photo detecting direction when the output from the polarizer and the wavelength plate resulting from the entrance of light having the light wavelength of 900 nm shows the phase difference of 60° between the X and Y axes;

FIG. 8A is a view showing a polarized state achieved when an output from a polarizer and a wavelength plate resulting from entrance of light having a light wavelength of 720 nm shows a phase difference of 75° between the X and Y axes;

FIG. 8B is a view showing an example change in light quantity achieved in a photo detecting direction when the output from the polarizer and the wavelength plate resulting from the entrance of light having the light wavelength of 720 nm shows the phase difference of 75° between the X and Y axes;

FIG. 9A is a view showing a polarized state achieved when an output from a polarizer and a wavelength plate resulting from entrance of light having a light wavelength of 600 nm shows a phase difference of 90° between the X and Y axes;

FIG. 9B is a view showing an example change in light quantity achieved in a photo detecting direction when the output from the polarizer and the wavelength plate resulting from the entrance of light having the light wavelength of 600 nm shows the phase difference of 90° between the X and Y axes;

FIG. 10A is a view showing a polarized state achieved when an output from a polarizer and a wavelength plate resulting from entrance of light having a light wavelength of 514.3 nm shows a phase difference of 105° between the X and Y axes;

FIG. 10B is a view showing an example change in light quantity achieved in a photo detecting direction when the output from the polarizer and the wavelength plate resulting from the entrance of light having the light wavelength of 514.3 nm shows the phase difference of 105° between the X and Y axes;

FIG. 11A is a view showing a polarized state achieved when an output from a polarizer and a wavelength plate resulting from entrance of light having a light wavelength of 450 nm shows a phase difference of 120° between the X and Y axes;

FIG. 11B is a view showing an example change in light quantity achieved in a photo detecting direction when the output from the polarizer and the wavelength plate resulting from the entrance of light having the light wavelength of 450 nm shows the phase difference of 120° between the X and Y axes;

FIG. 12 is a view showing dispersion of a refractive index of crystal making up a wavelength plate;

FIG. 13 is a view showing light wavelength characteristics of light receiving quantity levels of light receiving elements PDA and PDB of the embodiment;

FIG. 18A is an exemplary view showing ray diagrams of a part of the embodiment;

FIG. 18B is an exemplary view showing ray diagrams of the part of another embodiment;

FIG. 19 is an exemplary view showing ray diagrams of the part of still another embodiment;

DETAILED DESCRIPTION OF THE INVENTION

An embodiment of the present invention is described in detail hereunder by reference to the drawings.

Figure 1:
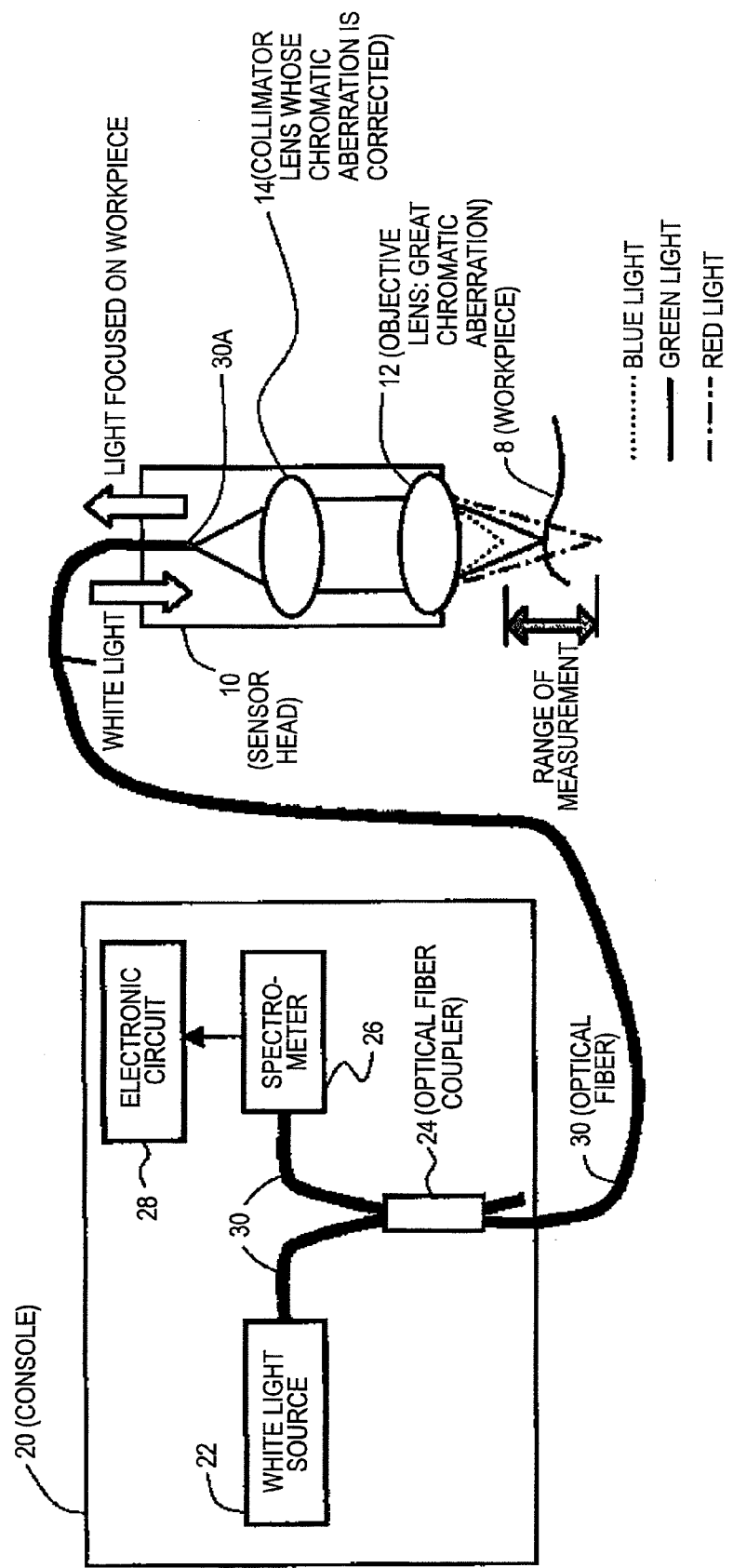
FIG. 1 is a ray diagram that shows an overall configuration of a chromatic confocal displacement meter and that partially includes a block diagram.
Figure 2:
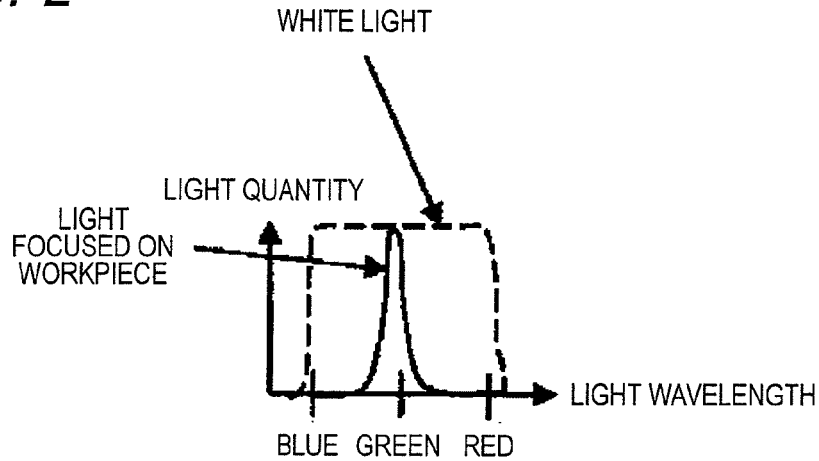
FIG. 2 is a similar view showing an example optical spectrum in an optical fiber.
Figure 3:
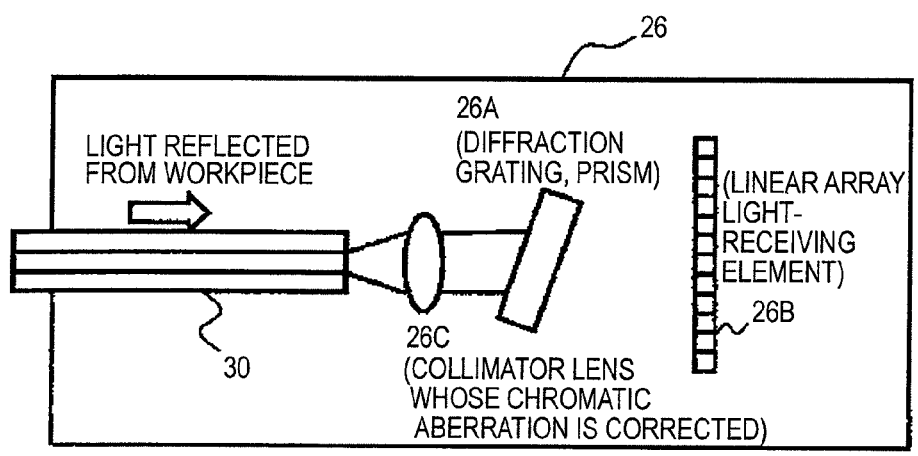
FIG. 3 is a similar ray diagram showing an example structure of a related-art spectrometer.
Figure 4:
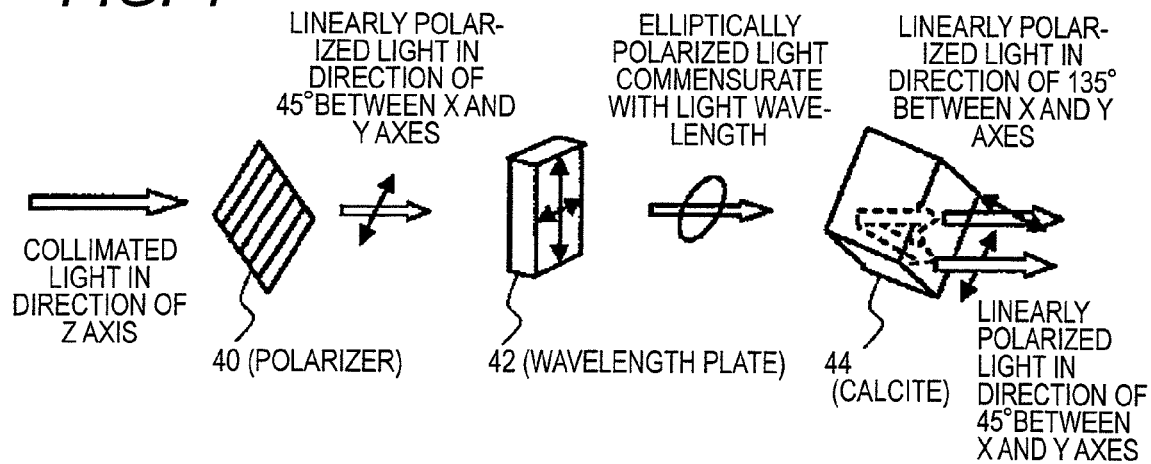
FIG. 4 is a ray diagram showing the configuration of a principal section of a spectrometer described in connection with a related art.
Figure 5:
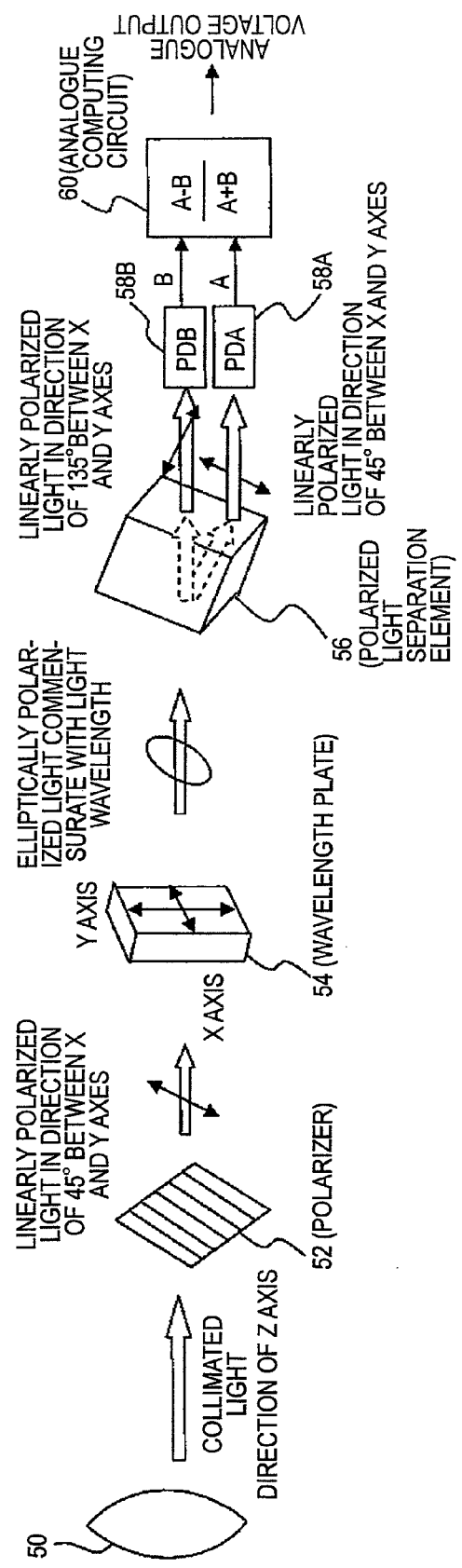
FIG. 5 is an oblique perspective view showing a configuration of a spectrometer of an embodiment of the present invention.

A first embodiment of the present invention is directed toward a chromatic confocal displacement meter having an overall configuration such as that shown in FIG. 1. As shown in FIG. 5, there are used as a spectrometer 26, a collimator lens 50 whose chromatic aberration for collimating light exiting from an optical fiber into parallel light is corrected; a polarizer 52 whose axis for dividing light under measurement collimated by the collimator lens 50 and caused to propagate in one direction (a direction Z) substantially equally into linearly polarized beams of two directions X and Y orthogonal to the propagating direction Z is arranged so as to be oriented in a direction of 45° between X and Y axes; a wavelength plate 54 of the order of zero that allows passage of two linearly polarized light output from the polarizer 52, to thus produce elliptically polarized light having a phase difference between an X-axis polarized wave and a Y-axis polarized wave that is commensurate with a light wavelength; a polarized light separation element 56 that separates the elliptically polarized light output from the wavelength plate 54 into a polarized light component oriented and inclined in a direction of 45° between the X and Y axes and a polarized light component oriented in a direction of 135° between the X and Y axes; light receiving elements (e.g., photodiodes PD) 58A and 58B for detecting quantities of the respective polarized light components; and an analogue computing circuit 60 that performs computation of (A−B)/(A+B) by use of light quantity voltage signals A, B detected by the light receiving elements 58A and 58B.

A wavelength plate of the order of zero rather than a multi-order wavelength plate is used as the wavelength plate 54 and arranged such that the lead axis is aligned to the direction of the X axis and that the lag axis is aligned to the Y axis. When light is caused to pass through a range of light wavelength from 450 nm to 900 nm by use of a quarter wavelength plate for a light wavelength of 600 nm, elliptically polarized light having a phase difference of about 120° to 60° between the X axis and the Y axis is obtained (a phase difference inversely proportional to a light wavelength will arise if dispersion of a refractive index of the wavelength plate is ignored).

A polarized beam splitter (PBS) can be used as the polarized light separation element 56.

Operation of the chromatic confocal displacement meter is hereinbelow described.

(1) Light under measurement in an arbitrary polarized state is collimated by the collimator lens 50, to thus be caused to propagate in the direction of the Z axis.

(2) Light described in connection with (1) is caused to pass through the polarizer 52. Linearly polarized light oriented in the direction of 45° between the X and Y axes is obtained.

(3) Light described in connection with (2) is caused to pass through the wavelength plate 54. There is obtained elliptically polarized light having a phase difference between the X and Y polarized waves that is commensurate with a wavelength.

(4) The polarized light separation element 56 divides the elliptically polarized light described in connection with (3) into a polarized light component oriented in a direction of 45° between the X and Y axes and a polarized light component oriented in a direction of 135° between the X and Y axes.

(5) The PDs 58A and 58B receive light, thereby obtaining the light quantity voltage signals A and B (The signals A and B may also be reversely switched to each other. The same result is obtained, so long as signs of the signals are reversed in a subsequent circuit).

(6) The analogue computing circuit 60 performs computation of (A−B)/(A+B), thereby producing a voltage output showing a gentle monotonous change in response to a change in light wavelength.

More specifically, an output from the polarizer 52 is linearly polarized light oriented in the direction of 45° between the X and Y axes. When the photodiode PDA (58A) and the photodiode PDB (58B) have received light without use of the wavelength plate, (i) a polarized state achieved at that time and (ii) a change occurred in light quantity in the direction of extraction of a polarized light component (hereinafter referred to as a "photo detecting direction") become as illustrated in FIGS. 6A and 6B.

The output from the polarizer 52 is caused to pass through the wavelength plate (a quarter wavelength plate for use with a light wavelength of 600 nm) 54. Dispersion of a refractive index of the wavelength plate 54 caused by a light wavelength is disregarded anyway as being small.

(1) (i) A polarized state achieved when a phase difference of 60° between the X and Y axes is obtained at entrance of light having a light wavelength of 900 nm and (ii) a change in light quantity achieved in the photo detecting direction become as illustrated in FIGS. 7A and 7B. A result of computation of (A−B)/(A+B) comes to +0.5.

(2) (i) A polarized state achieved when a phase difference of 75° between the X and Y axes is obtained at entrance of light having a light wavelength of 720 nm and (ii) a change in light quantity achieved in the photo detecting direction become as illustrated in FIGS. 8A and 8B. A result of computation of (A−B)/(A+B) comes to +0.26.

(3) (i) A polarized state achieved when a phase difference of 90° between the X and Y axes is obtained at entrance of light having a light wavelength of 600 nm and (ii) a change in light quantity achieved in the photo detecting direction become as illustrated in FIGS. 9A and 9B. A result of computation of (A−B)/(A+B) comes to 0.

(4) (i) A polarized state achieved when a phase difference of 105° between the X and Y axes is obtained at entrance of light having a light wavelength of 514.3 nm and (ii) a change in light quantity achieved in the photo detecting direction become as illustrated in FIGS. 10A and 10B. A result of computation of (A−B)/(A+B) comes to −0.26.

(5) (i) A polarized state achieved when a phase difference of 120° between the X and Y axes is obtained at entrance of light having a light wavelength of 450 nm and (ii) a change in light quantity achieved in the photo detecting direction become as illustrated in FIGS. 11A and 11B. A result of computation of (A−B)/(A+B) comes to −0.5.

Figure 14:
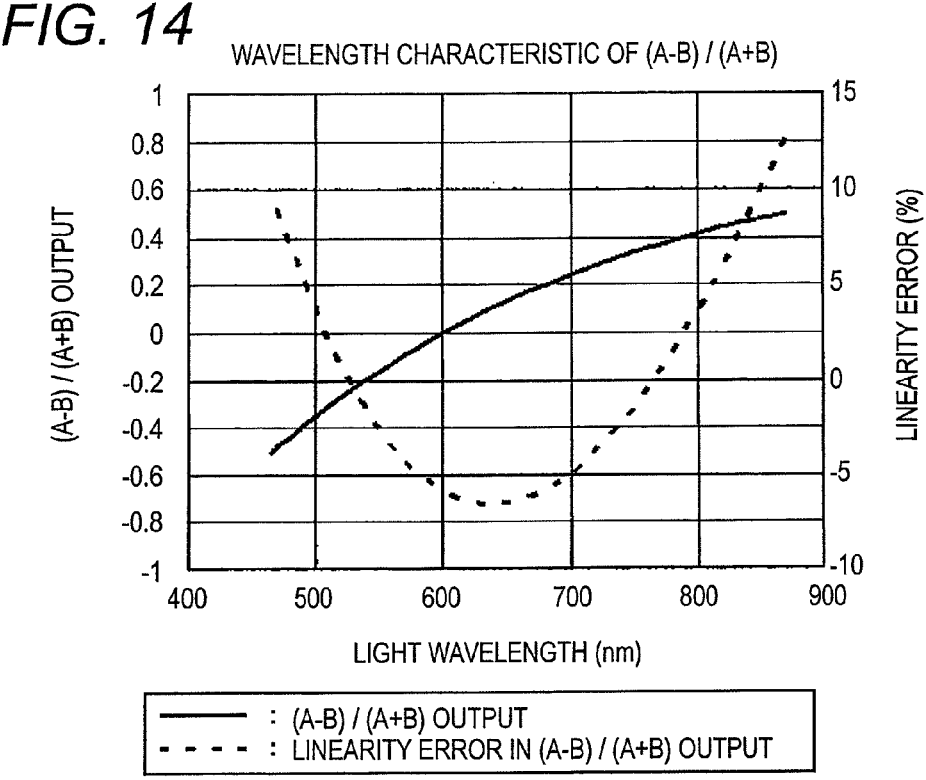
FIG. 14 is a view showing a light wavelength characteristic of an output of computation of $(A-B)/(A+B)$ of the present invention.

When consideration is given to the fact that the previously-disregarded dispersion of a refractive index of a crystal making up the wavelength plate 54 (a change in refractive index caused by a light wavelength) is like as illustrated in FIG. 12, light wavelength characteristics of light receiving levels of the two photodiodes PDA and PDB and linearity errors thereof become as illustrated in FIG. 13, and light wavelength characteristics of (A−B)/(A+B) and their linearity errors become as illustrated in FIG. 14.

Meanwhile, since the chromatic sensor shown in FIG. 1 uses the objective lens 12 exhibiting great chromatic aberration, light having a short wavelength, like blue light, exhibits a great refractive index, thereby making a focus at a close distance, as illustrated in FIG. 1. On the contrary, light having a long wavelength, like red light, exhibits a small refractive index, thereby making a focus at a long distance, as also illustrated in FIG. 1. The characteristic is not linear. A light wavelength characteristic acquired as a result of a change in the position of the focal point is depicted as; for instance, a curve such as that illustrated in FIG. 15.

Figure 15:
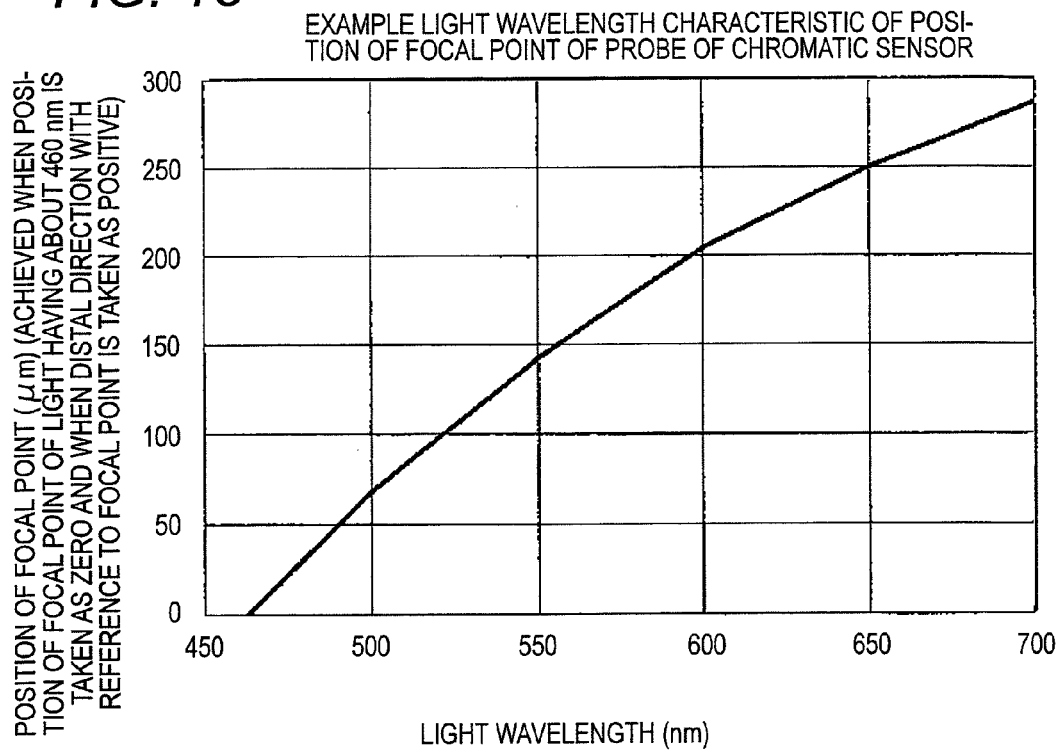
FIG. 15 is a characteristic showing an example light wavelength characteristic achieved at a position of a focal point of a probe of the chromatic sensor.
Figure 16:
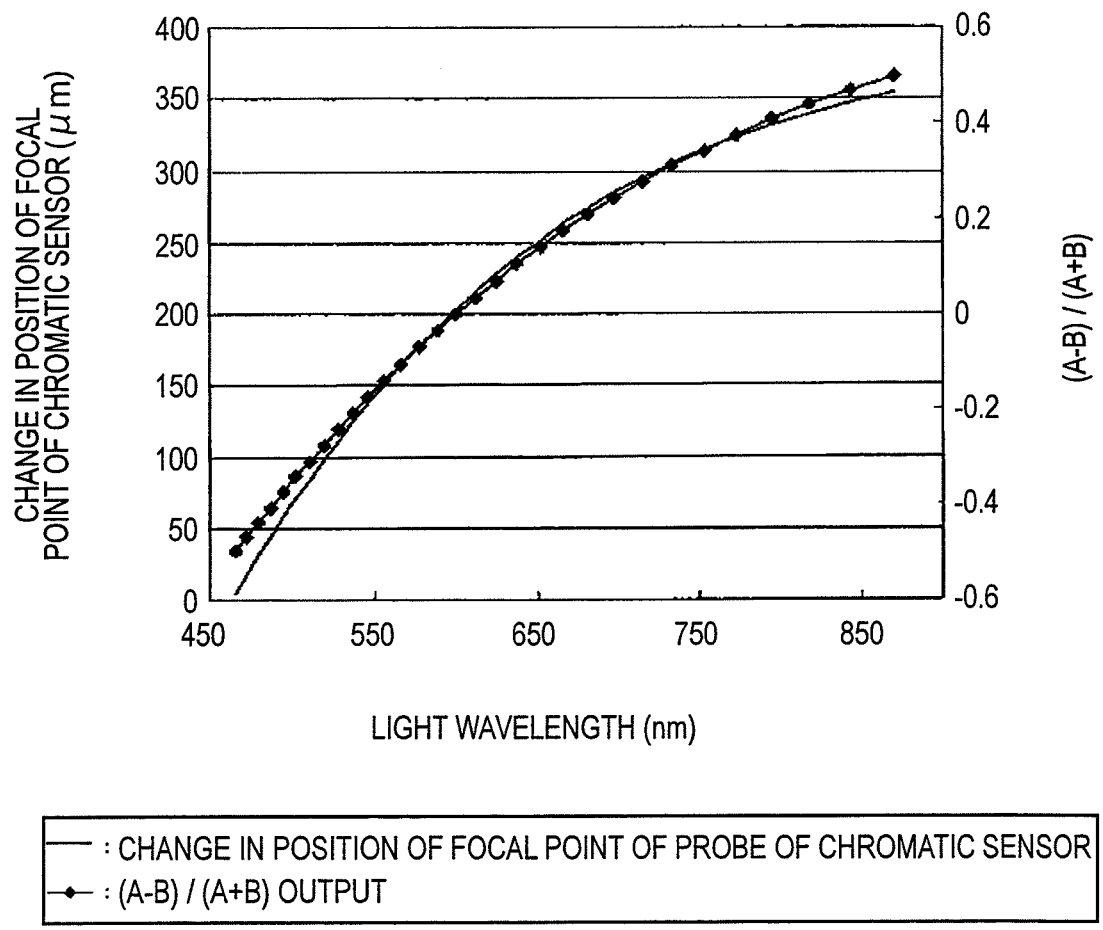
FIG. 16 is a view showing an example of a change in the position of the focal point of the probe of the chromatic sensor with respect to a light wavelength and the characteristic of computation of $(A-B)/(A+B)$.

The example light wavelength characteristic (A−B)/(A+B) of the spectrometer shown in FIG. 14 and the example light wavelength characteristic achieved at the position of the focal point of the probe of the chromatic sensor illustrated in FIG. 15 are superimposed on each other, whereupon the degree of agreement between the curves is understood to be considerably high as shown in FIG. 16.

Figure 17:
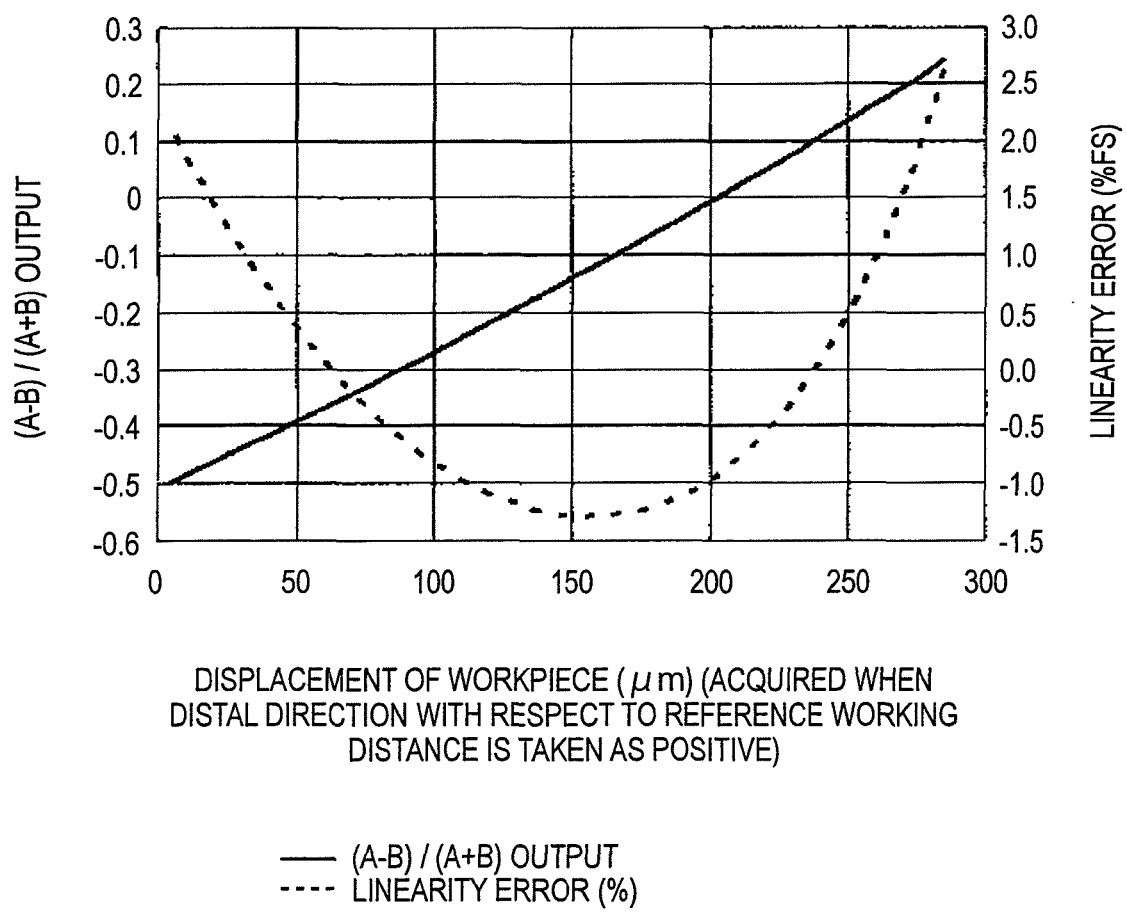
FIG. 17 is a view showing an example characteristic of an output of computation of $(A-B)/(A+B)$ in the chromatic sensor of the present invention in response to displacement of a workpiece (the position of the focal point of the probe of the chromatic sensor)

Accordingly, as a result of a probe characteristic and a spectrometer characteristic canceling each other, linearity is improved. An output characteristic (A−B)/(A+B) (an output from the spectrometer) responsive to displacement of the workpiece (the position of the focal point of the probe) finally becomes as illustrated as shown in FIG. 17. It is understood that a high speed analogue output of hundreds of kilohertz having a linearity error of several percentages or less can be output. An example light wavelength characteristic of a change in the position of the focal point of the chromatic sensor is one example. There is a possibility that the output characteristic can be made more linearly depending on a change in lens design. It is also possible to further subject the (A−B)/(A+B) output to linearity correction by means of an analogue circuit or a digital circuit, thereby enhancing linearity.

A second embodiment of the present invention that can improve the response speed is described in detail hereunder.

In a case that a photodiode is used as the light receiving element, a receiver circuit that realizes a high-speed response can be configured by using a photodiode having a little interterminal capacity (electrostatic capacity). Since an electrostatic capacity of depletion layer of p-n junction in the photodiode is proportional to an area of an acceptance surface of the photodiode, the high-speed response can be realized when the acceptance surface is made to small to make the electrostatic capacity smaller.

According to the chromatic confocal displacement meter of the first embodiment (shown in FIG. 5), the lights received by the photodiodes 58A and 58B are collimated lights as shown in FIG. 18A. When the acceptance surface is smaller than the sectional area of the collimated light, it is necessary to make an incident beam of the acceptance surface thinner. Therefore, in the second embodiment, the collimated light is made thin as a low light spot less than dozens μm diameter by using achromatic lenses 62A and 62B as shown in FIG. 18B.

For example, in a case that the photodiode is a Si-PIN photodiode, the acceptance surface of the photodiode of the first embodiment has a size of a few mm square or φ, the interterminal capacity is dozens pF, and the response speed is a few hundred kHz. On the other hand, according to the second embodiment, the acceptance surface of the photodiode of the has a size fallen within a range from dozens μm square or φ to a few hundred μm square or φ, the interterminal capacity is less than 1 pF, and the response speed that is more than a few MHz can be realized. When the photodiode is other type photodiode, for example, an avalanche photodiode, the response speed may be further improved.

In general, the maximum response speed is a few 100 kHz in the world of displacement meter. According to the second embodiment, a displacement meter having a response speed of more than 1 MHz, which is the fastest in the history of displacement meter, can be realized. Since the fast measurement that is not available through the conventional devices is realized, an evaluation of high-speed response of MENS actuator, an ultrahigh throughput of three-dimensional shape measurement and a real-time testing of a high-speed rotating body, for example, a turbine, which is unnecessary to reduce the high-speed rotating body for the testing, can be realized.

Figure 20:
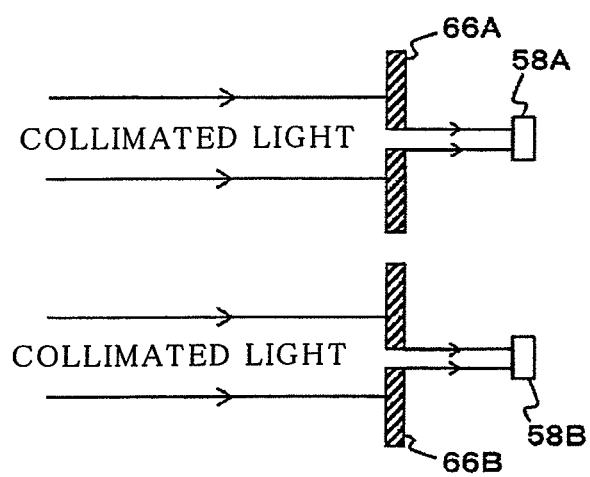
FIG. 20 is an exemplary view showing ray diagrams of the part of still another embodiment.
Figure 21:
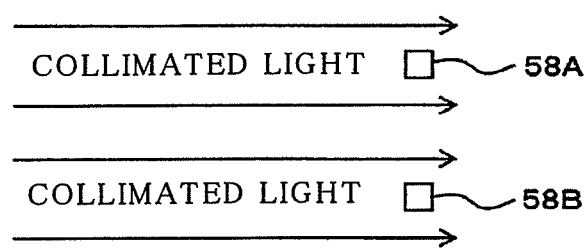
FIG. 21 is an exemplary view showing ray diagrams of the part of still another embodiment.

Besides, concave mirrors 64A and 64B shown in FIG. 19 can be used to replace the lenses 62A and 62B. When the lenses 62A and 62B shown in FIG. 18B or the concave mirrors 64A and 64B shown in FIG. 19 are used, the amount of light received at the light receiving elements 58A and 58B can be ensured. Further, if the amount of light received at the light receiving elements 58A and 58B can be ensured, throttle plates 66A and 66B shown in FIG. 20 can be used. And, if it is unnecessary to consider about stay light, the light receiving elements 58A and 58B, having an acceptance surface that is smaller than a sectional area of the collimated light, shown in FIG. 21 can be used.

In the embodiment, calcite or another polarizing separation element may also be used as the polarizing separation element 56 in lieu of the PBS. The direction of the polarized light component is not limited to 45° and 135°. Further, the wavelength plate 54 is also not limited to a quarter wavelength plate for use with a light wavelength of 600 nm. The orientations of the lead and lag axes of the wavelength plate are also not limited to the direction of the X axis and the direction of the Y axis. The axes can also be inclined within an X-Y plane. Specifically, the wavelength plate is rotationally adjusted within the X-Y plane while the lead axis is aligned to the direction of the X axis and the lag axis is aligned to the direction of the Y axis, whereby an individual difference in thickness of the wavelength plate (an individual difference in phase difference stemming from the individual difference in thickness) can be adjusted. Further, the light quantity signals A and B are also not limited to voltage signals, and computation is also not limited to analogue computation.

What is claimed is:

1. An optical displacement meter configured to measure a position of a measurement target, the optical displacement meter comprising:
    an objective lens;
    a broadband light source placed at a confocal point opposite to the measurement target with respect to the objective lens;
    a spatial filter placed at a position of a confocal point achieved when light reflected from the measurement target returns, the spatial filter being configured to extract light under measurement of a wavelength focused on the measurement target and to specify the wavelength of the light under measurement;
    a polarizer configured to divide the light under measurement collimated and caused to propagate in one direction into linearly polarized beams in first and second directions orthogonal to a propagating direction;
    a wavelength plate that allows passage of the linearly polarized beams in the first and second directions to produce elliptically polarized light having a phase difference commensurate with a light wavelength;
    a polarized light separator configured to divide the elliptically polarized light into first and second polarized light components in the first and second directions;
    a light receiving element configured to detect quantities of the first and second polarized light components; and
    a computing circuit configured to perform computation of (A−B)/(A+B) by use of light quantity signals A and B, which respectively correspond to the quantities of the first and second polarized light components detected by the light receiving element.

2. The optical displacement meter according to claim 1, wherein
    the light receiving element has an acceptance surface that is smaller than a sectional area of the collimated light passing through the polarized light separator.

3. The optical displacement meter according to claim 2, further comprising
    a concentrator configured to concentrate the collimated light passing through the polarized light separator.

4. The optical displacement meter according to claim 3, wherein:
    the concentrator is a light collection system; and
    the light receiving element is placed at a focal point of the light collection system.

* * * * *